United States Patent Office 2,880,826
Patented Apr. 7, 1959

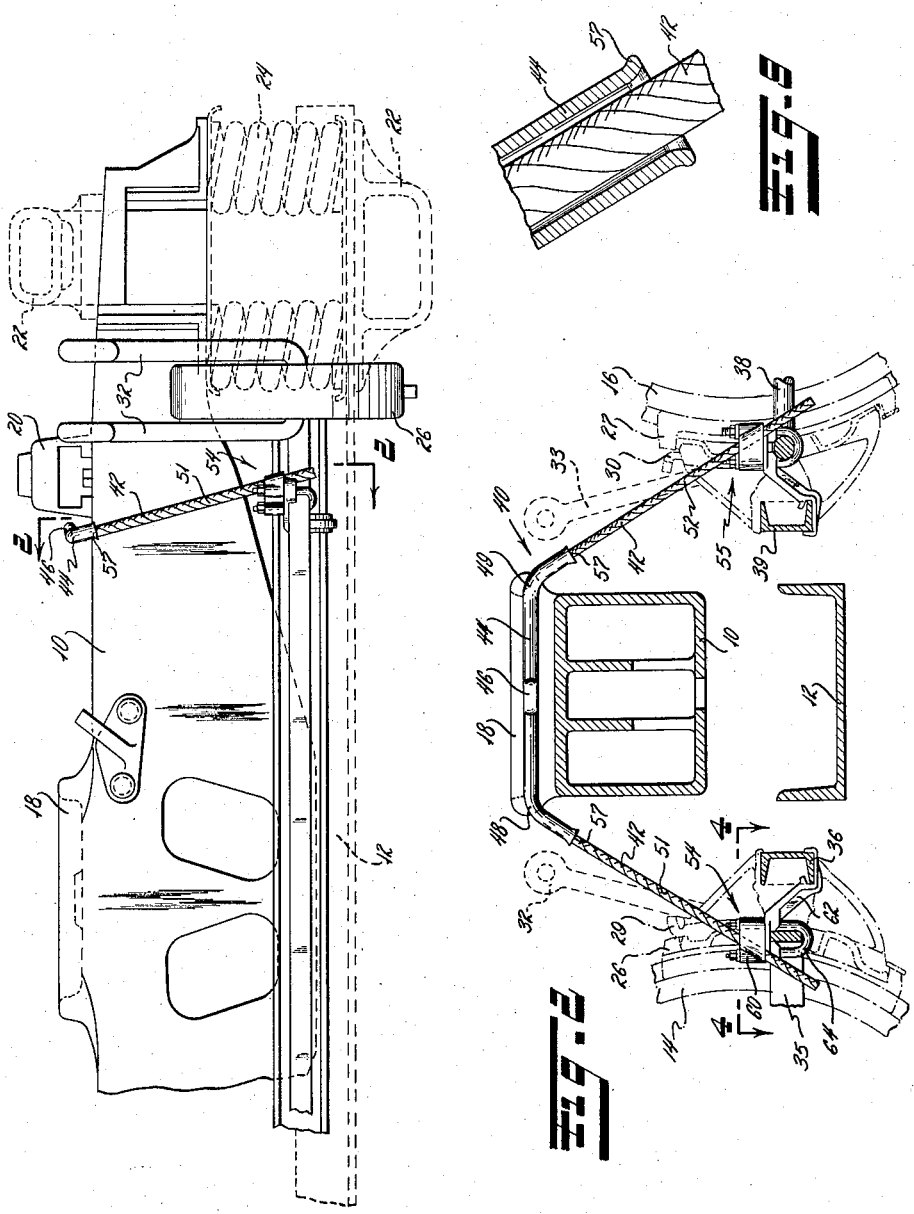

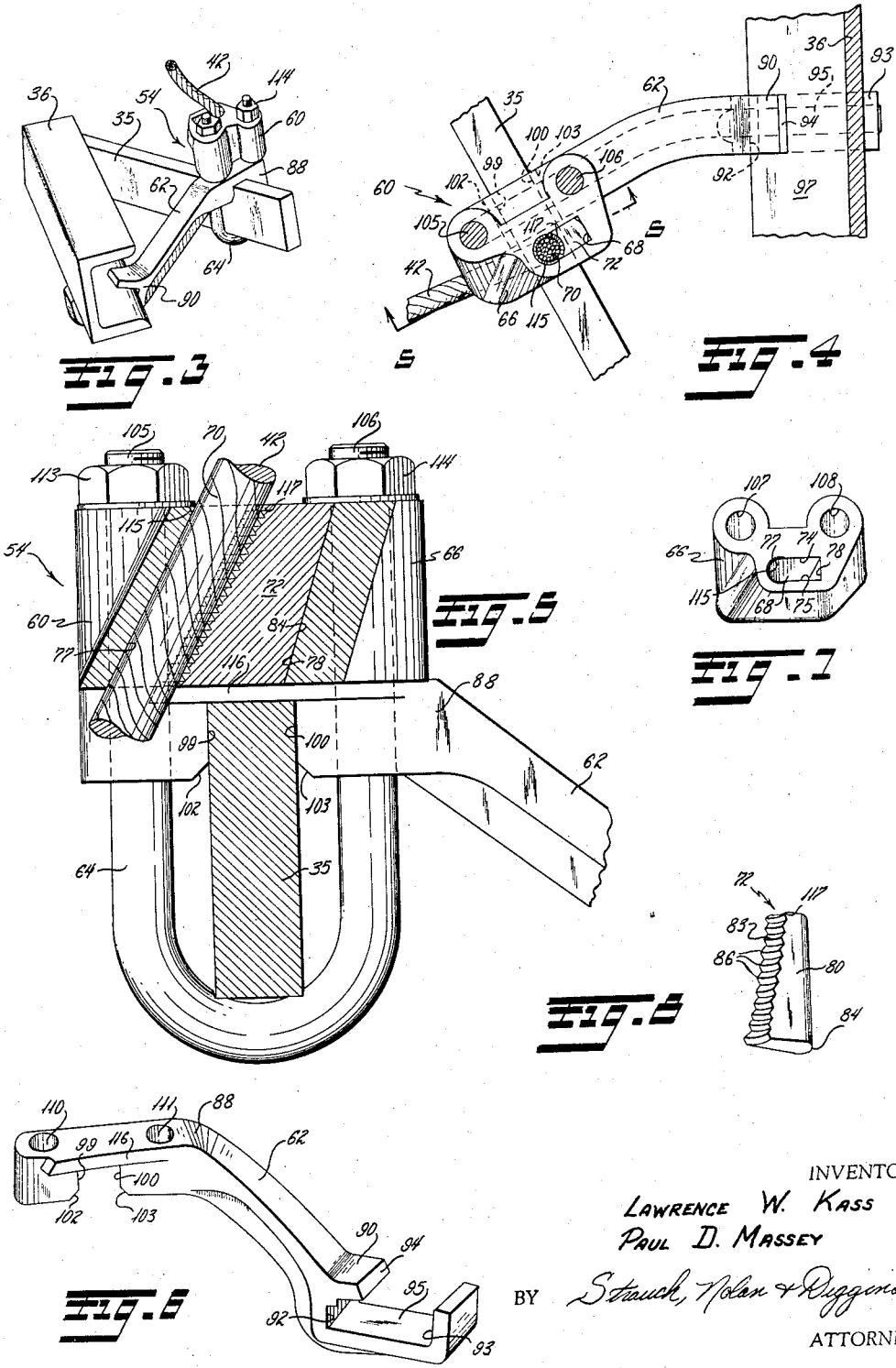

2,880,826

BRAKE BEAM SAFETY SUPPORT

Lawrence W. Kass, Bangor, Mich., and Paul D. Massey, South Whitley, Ind., assignors to Grip Nut Company, South Whitley, Ind., a corporation of Illinois Application June 21, 1954, Serial No. 438,138

5 Claims. (Cl. 188—210)

This invention relates to safety supports for railway brake gear and more particularly to emergency safety supports for preventing the brake beam members and parts carried thereby from falling to the rails in event of failure of the brake beams or failure of the usual hangers which normally support them.

The present invention is an improvement in safety supports of the type disclosed in our earlier Patent No. 2,364,221, granted December 5, 1944, and has as its primary purpose the provision of new and improved brake beam safety supports of the type described providing better security of interconnection between the tension and compression members of the brake gear and between the support elements and said members, and easier application to and more accurate alignment on the brake beams.

The safety support of the aforesaid patent comprises a continuous support element in the form of a run of semi-flexible cable having its opposite ends connected through clamp fittings with the oppositely related tension and compression members of the brake beams of a railway car truck. The center portion of the support cable is enclosed within a tubular sheathing member which is adapted to straddle a fixed portion of the truck bolster and is positioned in spaced relation to the bolster to prevent interference with the braking action of the brake beams and interference with vertical movement of the bolster when the car is moving.

In safety supports of this type the cable clamp fittings usually are mounted on the brake beam tension members and include brackets which extend to and engage the compression members to prevent relative movement of the tension and compression members away from each other in event of structural failure thereof. Each of the compression members is of channel section open toward the respective tension member, which is angularly related to the compression member and normally terminates within the confines of the channel section thereof. Therefore, so long as the ends of the tension and compression members are prevented by the bracket from separating from each other, they are maintained in mutually supporting relation by interengagement of the tension member with the flanges of the compression member channel section. The bracket can not prevent separation of the tension and compression members, however, where the clamp fitting which secures it to the tension member is initially or becomes loose on the tension member, as sometimes occurs either because of failure to properly tighten the U-bolt and nuts on original installation or because these elements subsequently work loose. In such cases the clamp fitting and bracket are free to slide lengthwise of the tension member on which they are mounted or to rotate about the tension member. When either such movement occurs the bracket carried by said fitting can no longer maintain the tension member end confined within the channel section of the compression member, and there is then nothing to prevent the compression member from dropping onto the rails and possibly causing derailment of the car.

It is, accordingly, an important object of this invention to provide new and improved brake beam safety supports capable of providing positive mutual interconnection between the tension and compression members even in event the safety support is improperly installed or works loose in service.

It is also an object to provide a novel safety support including a brake beam clamp bracket adapted to be fixed to one of the tension and compression members and having a socket portion engageable with the other of said members to prevent movement of said bracket with respect to either of said members and of said members with respect to each other.

The brake beam clamp brackets in the safety supports of the present invention provide a further advantage over those disclosed in the above mentioned patent in that they assure proper positioning of the cable clamp fittings with respect to the brake beam tension and compression members. The clamp brackets are of fixed length and, unlike those of the patent, include socket portions which engage the associated compression member to prevent all movement of the bracket with respect to the compression member except sliding movement lengthwise thereof. Since the tension and compression members are angularly related to each other and the distance between them varies along their length, there is only one position of the clamp bracket along the compression member at which its two ends can be fixed to the tension and compression members, respectively. Proper positioning of the clamp bracket and of the cable clamp fitting fixed thereto is thus assured during installation and positively maintained during service. This is of particular advantage in safety supports of the type wherein the cable is of fixed length and not adjustable in the cable clamp fittings, safety supports of this type being shown, for example, in United States Patent No. 2,335,628, issued November 30, 1943 to Anderson. With such support cables the predetermined location of the clamp bracket and cable fitting assures proper clearance of the cable over the truck bolster.

It is, therefore, a further object of this invention to provide new and improved brake beam safety supports including means assuring installation thereof in proper position on the brake beams.

A still further object is the provision of novel brake beam safety supports including means maintaining the support elements in proper position on the brake beams even in event of loosening of said elements in service.

Another advantage of the safety supports of this invention resides in the provision of angularly related tension member seating surfaces on the clamp bracket adapting the same to use on tension members of different cross-sectional shapes such, for example, as the round and rectangular section members presently in common use. These seating surfaces are such as to positively prevent rotation of the clamp bracket when mounted on rectangular section members, and to minimize the possibility of bracket rotation when mounted on tension members of round cross section. By thus preventing rotation of the clamp bracket the proper relationship between the tension and compression members is more securely maintained in event of failure of one or the other of said members.

Another of the features of the present invention resides in the provision of cable clamp fittings providing maximum security against loosening and slippage of the support cable in the clamp fitting. The interengaging surfaces of the clamp housing and wedge insert, which together constitute a cable clamp fitting, are in accordance with this invention so formed as to present minimum resistance to movement of the wedge insert within the housing. Thus, the side walls of the wedge insert and of the housing passage in which it slides are preferably made planar, and the slidingly abutting end walls of the insert and passage are so shaped that there is only line contact between said walls, whereby resistance to movement of the insert within the passage is minimized and a better and more secure grip on the cable is thus obtained.

It is, accordingly, a further object of this invention to provide new and improved brake beam safety supports having cable clamp fittings including means insuring optimum security against slippage of the cable clamped therein.

Still another feature of the present invention resides in the provision of means for minimizing wear and fatigue in the support cable due to flexing thereof. The cable must flex each time the brake beam is moved to either apply or release the brakes and normally will also flex slightly whenever the car is in motion, regardless of whether the brakes are in applied or released position. In the prior devices this constant flexing tends to cause fatigue in the wire of the cable, particularly at the points where the cable enters the sheathing member and clamp fittings, since the bending stresses in the cable are localized at these points. It has been found that these bending stresses may be distributed over a greater portion of the length of the cable, and fatigue in the cable thus minimized, by belling the ends of the sheathing member and rounding the edges of the clamp fitting where the cable enters the same. By so doing it also is possible to minimize wear of the cable due to abrasive contact between it and the associated sheathing member and cable clamp fitting, and to provide a greater degree of freedom for the cable to thus enhance the flexing action thereof.

It is, therefore, another object of this invention to provide novel brake beam safety supports wherein fatigue in and wear of the support cables is minimized and flexing movement thereof greatly facilitated.

These and other objects, features and advantages of this invention will become more fully apparent by reference to the appended claims and the following detailed description when read in conjunction with the accompanying drawings, wherein:

Figure 1 is a fragmentary front elevational view of a typical railway truck with its associated brake rigging and illustrating the position and attachment of the safety support of our invention;

Figure 2 is a sectional view on the line 2—2 of Figure 1, showing our improved safety support fitted at one end to a rectangular tension member and at its other end to a round tension member;

Figure 3 is a perspective view of one end of the safety support of Figure 1 as viewed toward the right in that figure;

Figure 4 is a sectional view taken substantially on the line 4—4 of Figure 2;

Figure 5 is a sectional view taken substantially on the line 5—5 of Figure 4;

Figures 6, 7 and 8 are perspective views of a brake beam clamp bracket, cable clamp housing and wedge insert, respectively, which together with the associated U-bolt constitute one of the safety support clamp assemblies of this invention; and Figure 9 is a detail view illustrating the belled end of a support cable sheathing member.

With continued reference to the drawings, wherein like reference numerals are used throughout to designate like parts, Figures 1 and 2 illustrate a conventional type of railway truck provided with the brake beam safety support of my invention. Briefly described, the truck comprises a bolster 10, spring plank 12 and the conventional wheels 14 and 16 rotatably positioned at opposite sides of the bolster 10. Bolster 10 is provided with the usual center bearing 18 and side bearings such as at 20, and is supported on the side frames 22 of the truck by means of the usual nests of springs 24.

A typical brake rigging consists of a brake beam on each side of the bolster, and the usual hangers, brake heads and brake shoes at each end of each beam. In Figures 2, the brake shoes 26 and 27 are supported by brake heads 29 and 30 respectively, and are positioned by hangers 32 and 33 to actively engage and brake the wheels 14 and 16, respectively. A tension member 35 and compression member 36 are connected and associated with the brake shoe 26 and head 29 in the usual manner while another tension member 38 and compression member 39 are associated with the brake shoe 27 and head 30 in the same manner. The usual operating levers and rods employed with the brake rigging are not illustrated as these form no part of the present invention and are well known in the art.

It will be noted that the tension member 35 on the left in Figure 2 is of rectangular cross section whereas tension member 38 on the right in said figure is of round cross section. Usually, of course, the two tension members are of like section, either round or rectangular depending on the particular type of brake rigging involved. Both forms of tension member have been included in Figure 2 simply to better illustrate the versatility of the improved safety support, which is adapted to use with brake beams having tension members of either form. This feature of the invention will be more fully described hereinafter with reference to Figures 5 and 6.

The safety support for the operating members of the brake beam is best illustrated in Figure 2 wherein it is indicated generally by reference numeral 40. The support extends between the oppositely related brake beams and is adapted to straddle and overhang the truck bolster 10 as shown in Figures 1 and 2. The safety support consists primarily of a run of woven wire cable 42 partially enclosed in a substantially rigid tubular sheathing member 44 having a suitable kink 46 and corners 48 and 49 formed therein which cooperate to prevent any slippage of cable 42 within the sheathing member. Sheathing member 44 divides cable 42 into a non-flexible center portion and two depending flexible end portions 51 and 52 which cooperate with the clamp assemblies 54 and 55, respectively.

The two ends of sheathing member 44 preferably are enlarged or belled as indicated at 57 in Figures 1, 2 and 9. It has also been found that by thus belling the ends of the sheathing member it is possible to provide substantially greater freedom of motion of the projecting end portions of the cable, and at the same time to minimize the danger of cable breakage due to abrasive contact between the sheath ends and cable or due to localization of bending stresses in the cable at the points of transition between the flexing and non-flexing portions thereof, i.e., at the ends of the sheathing member. Still another advantage of this construction resides in the easier assembly of the cable and sheath unit, insertion of the cable into the sheath is greatly facilitated by the belled ends of the sheath.

With continued reference to Figure 2, the left-hand clamp assembly 54 consists essentially of a cable clamp fitting 60, a brake beam clamp bracket 62 and a U-bolt 64 for securing the clamp fitting and bracket together and to the associated brake beam tension member 35. The right-hand clamp assembly 55 is of generally similar construction to assembly 54, but is reversed from left to right so that the two assemblies are symmetrical about bolster 10.

It is to be noted that the wedge insert 72 shown in Figure 8 may be used interchangeably in the left-hand clamp assembly 54 and right-hand assembly 55 of the safety support of Figure 2. Since the wedge insert is symmetrical about the plane centered between and parallel to its planar side walls 80 it is usable in either clamp assembly. The requirement for differently shaped wedge members for the right- and left-hand clamp fittings of prior safety supports is thus avoided in the devices of this invention.

Referring now more particularly to Figures 4-8 inclusive each of the cable clamp fittings such as 60 comprises a clamp housing member 66 having a tapered passage 68 therethrough in which is received an end portion 70 of cable 42 and the wedge insert 72 shown separately in Figure 8. Housing passage 68 is defined by parallel, planar side walls 74 and 75, and by end walls 77 and 78 angularly related to each other to provide the desired upward taper of the passage 68 defined thereby. Wedge insert 72 includes parallel, planar side walls 80 which bear slidably against side walls 74 and 75 of housing passage 68 when the wedge is inserted into said passage. One end wall 83 of the wedge member is arranged generally parallel to and spaced from the opposed end wall 77 of passage 68 to provide a space between said opposed walls in which is received the end portion 70 of cable 42, the walls 77 and 83 preferably being curved transversely of their length so as to snugly interfit with and firmly clamp the cable end received therebetween. End wall 83 of the wedge insert preferably has a plurality of teeth 86 formed thereon as shown, the teeth being arranged to partially encircle the cable and to act to bite into the cable to prevent it from pulling out of the clamp fitting. At the same time any possible movement of the wedge insert by the cable will, due to the taper of the housing passage, be counteracted by tightening of the wedge within the fitting, so that it is practically impossible to withdraw the cable from within the fitting.

As is best illustrated in Figures 4, 7 and 8, the other pair of opposed end walls 78 and 84 of the housing passage 68 and wedge insert 72, respectively, preferably are so shaped as to have only line contact with each other. As shown, end wall 78 of the housing passage is planar whereas end wall 84 of the insert is circularly or otherwise curved. The resulting line contact between the passage and wedge insert greatly facilitates locking movement of the wedge within the pasage and thus provides a better gripping action on the support cable.

With reference now to Figures 4 and 6, the brake beam clamp bracket 62 shown in these figures comprises a body portion 88 which engages the tension member 35 and on which is seated the base of the cable clamp fitting 60, and a socket portion 90 which extends to and engages compression member 36 to prevent both vertical and transverse movement of the tension and compression members with respect to each other when the clamp bracket is fixed in position on the tension member. To provide this necessary interlock between the compression member and clamp bracket the socket portion 90 of the latter is provided with vertically disposed wall members 92 and 93 upstanding on either side of the flanged compression member 36 when the bracket is assembled onto said member, and with horizontally disposed wall members 94 and 95 which overlie and underlie the upper and lower surfaces, respectively, of flange 97 of the compression member 36 (Figure 6). Horizontal wall member 94 of the bracket is deflected slightly upward as shown, to permit assembly of the clamp bracket onto the compression member by a downward rotary movement of the bracket after first placing the outer edge of wall 94 thereof in contact with the upper surface of compression member flange 97.

The body portion 88 of bracket 62 has formed thereon vertically disposed tension member seating surfaces 99 and 100, and additional seating surfaces 102 and 103 angularly disposed with respect to the vertical surfaces 99 and 100. These several seating surfaces, which extend the full depth of body portion 88 as seen shown in Figure 4, adapt the clamp bracket to use on brake beams having tension members of different sizes and cross-sectional shapes such, for example, as the round and rectangular section members shown at 38 and 35 in Figure 2. Regardless of the particular tension member section use, the clamp bracket seating surface arrangement of this invention minimizes the possibility of the bracket rotating about the tension member to which it has been applied.

Clamp bracket 62 may be fixed to the associated tension member 35, and cable clamp fitting 60 fixed to the body portion 88 of the bracket, by application of a U-bolt 64 the base portion of which encircles the tension member and the threaded legs 105 and 106 of which extend through bores 107 and 108 in fitting 60 and through aligned bores 110 and 111 in bracket 62. The nuts 113 and 114 of the U-bolt may be tightened down to firmly clamp the bracket 62 to tension member 35, and to draw the fitting 60 down onto bracket 62 to thereby force wedge insert 72 upwardly into housing passage 68 and into locking engagement with the cable end 70 at the desired point along the length thereof.

Tension member 35 and compression member 36 are, as most clearly shown in Figure 3, angularly related to each other so that the distance between them varies along their lengths. Since clamp bracket 62 is of fixed length, there is but one position along the tension and compression members at which the body and socket portions of the bracket may be fixed to the respective brake beam members. Proper positioning of the clamp bracket during installation thereof on the brake beam is thus assured, and the clamp bracket prevented from shifting along the brake beam in event the U-bolt and unit assembly is not properly tightened on installation or should work loose during service.

As best illustrated in Figures 1, 4 and 5, it should be noted that the angular placement and location of housing passage 68 and and the configuration of wedge insert 72 are such as to place the cable in a position where any excess portion thereof that may project from the bottom of the fitting will be disposed in axial offset relation with respect to tension member 35 and also to readily clear the U-bolt 64 and bracket 62, the body portion 88 of which may be provided with a horizontally disposed flange 116 having an end wall engaging and locating the cable. This arrangement eliminates all interference between the cable and tension member, and also provides a clamp fitting which can be secured to the cable without bending the latter. Any abnormal pull or weight to which the cable may be subjected when acting in its emergency capacity will merely act as a direct tensional pull on the cable all of which is apart from the slight flexing of the cable that takes place during operation of the brakes. The latter flexing is induced over a considerable length of cable, and therefore will be ineffective to cause any weakness which might lead to failure of said cable.

Fatigue in and wear of the cable is further minimized in accordance with this invention by belling the ends of cable sheathing member 44 as described above, and by rounding the upper edges 115 of housing passage 68 and upper edge 117 of wedge insert 72 as best shown in Figures 4 and 5. Abrasive contact between the cable and the clamp housing and insert is thus avoided, and at the same time the bending stresses in the cable are distributed over a greater portion of the length thereof.

From the foregoing disclosure it will be apparent that the present invention provides new and improved brake beam safety supports characterized by easier application, longer service life and greater degree of safety.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A safety support cable clamp and cable assembly for the brake beam of a railway truck comprising a run of semiflexible cable having a free end disposed adjacent the brake beam, a cable clamp housing initially adjustable along said cable free end having a tapered passage through which said cable end extends defined by planar side walls parallel to each other, interconnected by a first end wall transversely curved correspondingly to said cable and a second end wall axially angularly related to said first end wall so as to provide a passage of tapering width between said end walls, both of said passage end walls being inclined in the same general direction with respect to said clamp housing end faces whereby the cable end projecting therefrom is disposed at one side of said clamp housing to clear said brake beam, a wedge insert slidable in said passage having side walls parallel to said passage side walls and end walls one of which is parallel to said passage first end wall and spaced therefrom to receive said cable in the space therebetween and the other of which bears slidably against said passage second end wall, and means engaging an end of said wedge insert and urging said wedge insert inwardly of said tapered housing passage to firmly clamp the cable between the opposed walls of said passage and said wedge insert.

2. In a railway truck brake rigging safety support having a flexible support cable housed between its ends in an inflexible sheathing and a support bracket supported by the channel shaped brake beam compression member and clampingly engaging the brake beam tension member and the adjacent free end of said cable: a support bracket and clamp means comprising a bracket having an upwardly opening socket member at one end comprising a pair of end walls spaced to receive the brake beam compression member therebetween, a bottom wall interconnecting the lower ends of said end walls and engaging the undersurface of the brake beam compression member and an inwardly and upwardly inclined wall member substantially shorter than said bottom wall carried by the end wall remote from said one bracket end and adapted to overlie a portion of said brake beam compression member to slidably mount said bracket thereon and a clamp formation at the other end comprising a generally horizontal disposed plate member having laterally spaced openings adjacent one lateral edge thereof and laterally spaced depending bosses extending along the opposite lateral edge the opposing walls of which define a pair of parallel opposed seating surfaces and a pair of downwardly and inwardly facing seating surfaces adapted respectively to selectively engage the respective surfaces of different shaped brake beam tension members; a clamp housing having an upwardly tapering, laterally inclined passage therethrough disposed along one laterally extending face thereof and laterally spaced openings disposed adjacent the opposite lateral face; a tapered wedge insert adapted to slidingly fit in said inclined passage with one laterally disposed wall engaging its opposed passage wall and the other laterally disposed wall spaced from its opposed passage wall to define a space for receiving an end of said cable; a U-bolt adapted to straddle said brake beam tension member with its legs extending upwardly through the aligned openings of said clamp plate and said clamp housing; and a securing nut threaded on each leg of said U-bolt and adapted upon tightneing thereof to clamp said clamp plate against said brake beam tension member, said clamp housing against said clamp plate and engage the lower end of said wedge insert against said clamp plate to tightly wedge said cable in said housing and clamp said cable, said housing and said clamp plate to said brake beam tension member.

3. The combination defined in claim 2 wherein the opposite ends of said inflexible sheathing are belled and the upper end of said passage wall opposite said other laterally disposed wall of said wedge insert being rounded whereby the flexing movements of said cable incident to braking of said railway truck and supporting of said brake beam may freely occur without localized abrasion and stressing of said cable at said ends of said sheathing and said end of said passage wall.

4. In a safety support for the brake beam of a railway truck having tension and compression members and a support cable with an end portion free for limited movement with respect to the brake beam, a cable clamp assembly for clamping said cable free end to one of said members of said brake beam comprising a cable clamp housing having a passage therethrough adapted to initially freely slidably receive said cable end and defined by a pair of side walls interconnected by first and second end walls angularly related to each other to provide a passage of tapered width therebetween, a wedge insert slidable in said housing passage having side walls parallel to and slidable against said passage side walls and having opposite end walls one of which is parallel to and has line contact only with said passage first end wall and the other of which is parallel to said passage second end wall and spaced therefrom so as to provide a space therebetween in which said cable free end portion may be clamped by movement of said wedge insert inwardly into said housing passage.

5. In a safety support for the brake beam of a railway truck having tension and compression numbers and a support cable with an end portion free for unlimited movement with respect to the brake beam, a cable clamp assembly for clamping said cable free end to one of said members of said brake beam comprising a cable clamp housing having a passage therethrough adapted to initially freely slidably receive said cable end and defined by a pair of planar side walls interconnected by first and second end walls angularly related to each other to provide a passage of tapered width therebetween, a wedge insert slidable in said housing passage having planar side walls parallel to and slidable against said passage side walls and having end walls one of which is parallel to said passage first end wall and slidably abuts thereagainst and the other of which is parallel to said passage second end wall and spaced therefrom so as to provide a space therebetween in which said cable free end portion may be clamped by movement of said wedge insert inwardly into said housing passage, said slidably abutting end walls of said wedge insert and housing passage being respectively shaped to have substantially line contact therebetween.

References Cited in the file of this patent

UNITED STATES PATENTS

| | | |
|---|---|---|
| 656,993 | Mossman | Aug. 28, 1900 |
| 824,556 | Lowry et al. | June 26, 1906 |
| 1,943,809 | Bischof | Jan. 16, 1934 |
| 1,969,923 | Carothers | Aug. 14, 1934 |
| 2,003,802 | Crone | June 4, 1935 |
| 2,159,582 | Anderson | May 23, 1939 |
| 2,192,965 | Ekholm et al. | Mar. 12, 1940 |
| 2,196,249 | Busse | Apr. 9, 1940 |
| 2,252,221 | Van Cleave et al. | Aug. 12, 1941 |
| 2,348,608 | Cleverly | May 9, 1944 |
| 2,356,018 | Van Sweringen | Aug. 15, 1944 |
| 2,364,221 | Kass | Dec. 5, 1944 |
| 2,518,120 | Busch | Aug. 8, 1950 |
| 2,529,327 | Carlson | Nov. 7, 1950 |
| 2,622,709 | Wilson | Dec. 23, 1952 |